July 15, 1930.  E. L. ACKERMAN ET AL  1,770,449
CLUTCH DEVICE
Filed Jan. 16, 1929
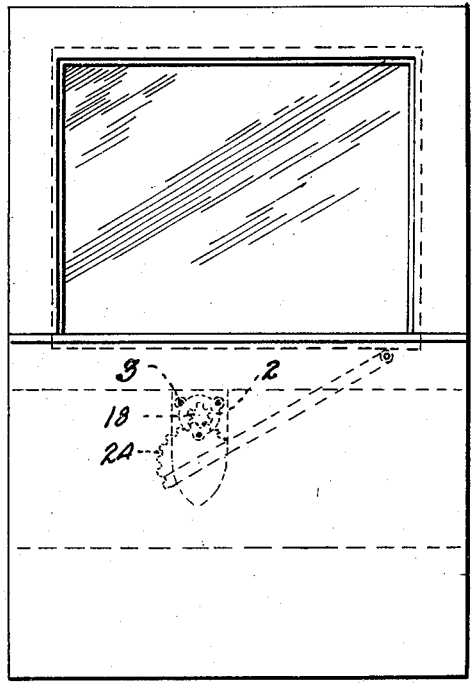
*Fig. 1*
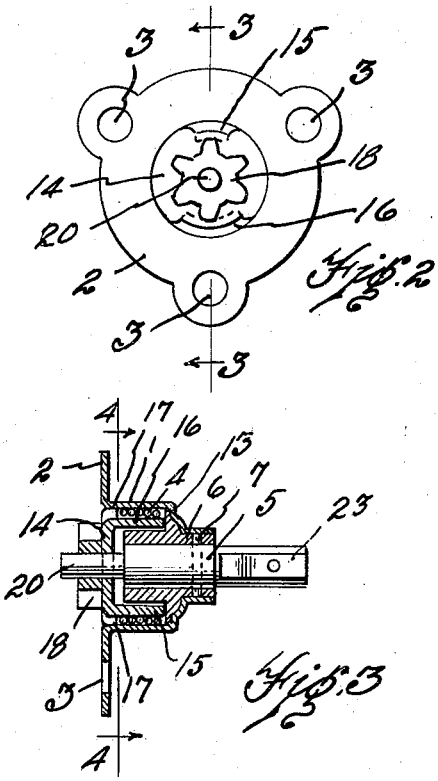
*Fig. 2*
*Fig. 3*
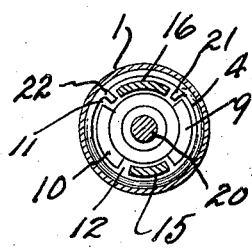
*Fig. 4*
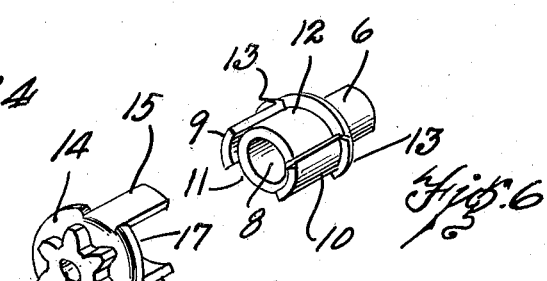
*Fig. 6*
*Fig. 7*
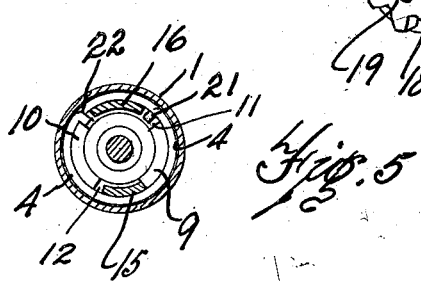
*Fig. 5*
INVENTORS
EDWARD L. ACKERMAN
BY ALOIS J. ZWIERZINA
ATTORNEY.

Patented July 15, 1930

1,770,449

UNITED STATES PATENT OFFICE

EDWARD L. ACKERMAN AND ALOIS J. ZWIERZINA, OF DETROIT, MICHIGAN, ASSIGNORS TO ACKERMAN-BLAESSER-FEZZEY, INC., OF DETROIT, MICHIGAN, A CORPORATION OF MICHIGAN

CLUTCH DEVICE

Application filed January 16, 1929. Serial No. 332,976.

This invention relates to clutch devices and the object of the invention is to provide a clutch device for use on a window regulator and arranged to lock the window regulator from movement except by operation of the regulator crank.

A purpose and feature of this invention is to provide a clutch device in which a cylindrical coiled spring is positioned within a casing and a driving and a driven member is rotatably mounted within the spring, the driven member having a pair of lugs extending into the spaces between lugs on the driving member and with the inturned ends of the spring engaging in one of the spaces of the driving member on opposite sides of the lug of the driven member therein. These lugs and spaces of the driving and driven members are so arranged and formed that, through rotation of the driving member and the consequent expansion of the spring by one of the lugs and release of the spring from frictional contact with the casing, the other lug of the driving member engages a lug of the driven member to directly drive the driven member in either direction of rotation of the driving member. Preferably the parts are so proportioned that, at the time the lug of the driving member comes to direct contact with the said lug of the driven member, the spring end through which the contraction of the spring is accomplished engages the other lug of the driven member approximately simultaneously.

Another object of the invention is to provide a clutch device comprising a casing and a clutch member adapted to be expanded into engagement with the wall of the casing by pressure applied to the window or parts attached thereto to lock the window from movement, the clutch device being adapted to be contracted by rotation of the crank to allow the window regulator to be operated.

A further object of the invention is to provide a pair of actuating members arranged to inter-engage, one member being adapted to release the clutch device when it is rotated and the other member being adapted to lock the clutch device when it is rotated in relation to the first member.

These objects and the several novel features of the invention are hereinafter more fully described and claimed and the preferred form of construction by which these objects are attained is shown in the accompanying drawings in which—

Fig. 1 is an elevation of an automobile door showing the regulator with which the clutch device is utilized.

Fig. 2 is a view of the inner side of the clutch device and casing.

Fig. 3 is a section taken on line 3—3 of Fig. 2.

Fig. 4 is a section taken on line 4—4 of Fig. 3.

Fig. 5 is a section similar to Fig. 4. showing the clutch device released.

Fig. 6 is a perspective view of the releasing member.

Fig. 7 is a perspective view of the locking member.

The device comprises a casing 1 shown in Fig. 3 which is substantially cup shaped in form and is provided with an outwardly extending flange 2. This flange is provided with apertures 3 to receive retaining screws (not here shown) by means of which the device may be secured to an automobile door frame. A coiled spring 4 is positioned in the casing 1 as shown in Figs. 3 and 4 and this coiled spring fits snugly against the casing wall so as to maintain it in position. As shown in Fig. 3 a shaft 5 extends through the casing and a member 6 shown in Fig. 6 is mounted on a shaft 5 and is secured thereto by a pin 7 as indicated in Fig. 3 or by any other suitable means. This member 6 is provided with an aperture 8 through which the shaft extends and is also provided with two lugs or wide ribs 9 and 10 as shown, which provide spaces 11 and 12 therebetween. The lugs 9 and 10 at the lower end are each provided with a flange or projection 13 which, as shown in Fig. 3, provides a seat for the end of the coiled spring 4. A member 14 is provided and is formed with two extending lugs 15 and 16, the lug 16 being wider than the lug 15 as shown in Fig. 4. These lugs are depressed inwardly from the periphery of the member 14 so that they extend within the spring 4 as shown in Fig. 3 while the flange 17 of the member 14 provides a seat for the end of the spring 4 as shown and acts as a retainer to hold the spring in the casing. In this manner the spring is held between the flanges 17 of the member 14 and the projections or flanges 13 of the member 6. A gear 18 is secured to the member 14 as shown in Fig. 7 and an aperture 19 is provided through the gear and through the member 14 through which the small end 20 of the shaft 5 extends.

In assembly the member 6 is first positioned in the bottom of the casing with the shaft 5 to which it is secured and the spring 4 is then inserted in the casing against the projections 13 of the member 6 and the spring 4, as shown in Fig. 4, is provided with an inturned end 21 at the lower end and with an inturned end 22 at the upper end. These ends are inserted in the space 11 of the member 6 and extend into the path of movement of the lugs 9 and 10 as shown. The member 14 is then inserted over the end 20 of the shaft 5 and the lug 16 is inserted between the ends 21 and 22 of the spring 4 while the lug 15 is inserted in the space 12 on the member 6.

In operation, the crank is secured to the squared end 23 of the shaft 5 and by rotation of this shaft in one direction the lug 10 is moved into contact with the end 22 of the spring 4 as shown in Fig. 5 and this rotation of the shaft and member 6 tends to contract the spring and thus releases it from binding engagement with the casing and allows the spring to rotate with the lug 10. As the lug 10 is rotated the lug 9 engages the lug 15 of the member 14 and rotates the member 14 with the member 6. By this arrangement the gear 18 is rotated and turns the gear segment 24 with which it meshes to raise or lower the window as will be understood from Fig. 1. Upon rotation of the crank in the opposite direction the lug 9 of the member 6 engages the spring end 21 and contracts the spring and the lug 10 engages the lug 15 and carries the lug 15 and member 14 with the member 6 in the opposite direction. This provides a release by rotation of the crank handle whereby the clutch device is released as soon as the rotation of the shaft by the crank handle is started.

I have shown the driving member 6 as having the longitudinal groove or space 12 extending longitudinally thereof less in width than the opposite space 11 but the invention is not confined to this specific arrangement, the feature of the invention as above stated being to provide a construction in which the lug 9 or 10, depending upon the direction in which the driving member 6 is turned, will engage the lug 15 of the second or driven member 14 and thus drive the same and avoid the necessity of driving the member 14 solely by reason of the lug 16 engaging a spring end as has been the general practice in this art.

It is thus necessary to so construct the device that a sufficient space between the longitudinal edges of the fingers or lugs 15 and the respective adjacent edges of the lugs 9 and 10 to permit the opposite edges of the said lugs 9 and 10 to engage the respective opposite side edges of the lug 15 approximately at or before the time the spring ends 21 and 22 are brought to respective engagement with the lug 16 through rotation of the driving member. Structures of this class are made principally of stampings and therefore are not accurately constructed or carefully finished and, while it is preferable that the spring ends 21 or 22, depending upon the direction of rotation of the driving member, should engage the respective edge of the member 16 at approximately the time an edge of the member 15 is engaged by the said lugs 9 and 10 and thus apply pressure to the driven member at two approximately diametrically opposite points.

It is not essential, however, that the parts be constructed or assembled with so great an accuracy as the driven member will be effectively and efficiently operated if the entire driving pressure is applied solely through the member 15, sufficient space being provided between the edges of the member 16 and the adjacent edges of the lugs 9 and 10 to permit a contraction of the spring at the time the lug 15 is engaged by one or the other of the lugs 9 and 10 of the member 6.

When pressure is applied to the window or regulator parts the gear segment 24 meshing with the gear 18 tends to turn the gear 18 and the member 14 including the lugs 15 and 16. As will be understood from Figs. 4 and 5 movement of the lug 16 in one direction engages the spring end 21 and tends to expand the spring into tight engagement with the wall of the casing 1. This immediately locks the gear 18 from turning and the greater the pressure applied to the spring the more firmly it is locked in the casing and thus prevents movement of the window or regulator parts. Movement of the lug 16 in the opposite direction causes it to engage the spring end 22 to expand the spring into tight engagement with the casing 1 and the greater the pressure applied in this direction the more firmly the spring is locked in position. Due to the spaces between the lugs on the member 6 and the lugs on the member 14 these members may move to a limited extent in relation to each other and these lugs are so arranged that when the crank is rotated the lug 15 is driven by the lugs 9 or 10 moved into engagement therewith thus driving the rotatable member 14, the gear 18 of which meshes with the gear segment 24 and operates the regulator with a direct contact and not by driving solely through the ends 21 or 22 of the spring while the lugs 9 or 10 on their opposite sides contact the spring ends 21 or 22 to release the spring. On the other hand when the member 14 is turned the lug 16 engages either spring end 21 or 22 to lock the clutch device.

From the foregoing description it becomes evident that the device is very simple and efficient in operation, will not easily get out of order, is composed of few parts and is of consequent low manufacturing cost and provides a device which accomplishes the objects described.

Having thus fully described our invention, its utility and mode of operation, what we claim and desire to secure by Letters Patent of the United States is—

1. In a clutch device, a casing, a shaft rotatably mounted in the casing, a coiled spring positioned in the casing and frictionally engaging the inner wall of the casing, a member secured to the shaft within the coiled spring and having projections against which one end of the coiled spring engages, the member being provided with a pair of spaced lugs extending longitudinally thereof and the spring being provided with inturned ends extending into one of the spaces between the lugs and engaging over the edges of the lugs, a second member rotatable in relation to the first member and having a lug extending into the space between the inturned spring ends on one side and having a second lug engaging between the lugs of the first member on the opposite side, the arrangement being such that upon rotation of the second member in either direction in relation to the first member the first lug of the second member is moved into engagement with either spring end to expand the spring and upon rotation of the first member one of the lugs of the first member is moved into engagement with one of the spring ends to contract the spring, the said first member during rotation being adapted to carry the second member therewith by direct contact of one of its lugs with the second lug of the second member, and a gear secured to the said second member.

2. In a clutch device, a casing, a shaft rotatably mounted in the casing, a member secured to the shaft and having a pair of lugs, a second member rotatably mounted in relation to the first member and having a pair of lugs extending between the lugs of the first member, a coiled spring positioned in the casing and frictionally engaging the wall of the casing, the said spring having inturned ends extending into one of the spaces between the lugs of the first member and on opposite sides of one lug of the second member, the lugs of the first member being adapted to engage the opposite lug of the second member during rotation of the first member in either direction to carry the second member therewith, the arrangement being such that rotation of the first member in either direction moves one of the lugs of the first member into engagement with one of the ends of the spring to contract the spring and rotation of the second member in either direction in relation to the first member moves one lug of the second member into engagement with either end of the spring to expand the spring into binding engagement with the wall of the casing and a gear secured to the said second member.

3. In a clutch device, a casing, a shaft rotatably mounted in the casing, a member secured to the shaft and having a pair of lugs, the said member being provided with a radially extending projection at the base of each lug, a second member having a pair of lugs extending between the lugs of the first member, the second member being rotatable on the shaft to a limited extent in relation to the first member and having an extending flange fitting within the casing, a coiled spring fitting within the casing between the flange of the second member and the projections of the first member, the coiled spring having inturned ends extending into one of the spaces between the lugs of the first member and on opposite sides of one lug of the second member, the arrangement being such that rotation of the said lugs of the second member in either direction engages one of the adjacent spring ends to expand the spring and rotation of the first member moves one of the lugs of the first member into engagement with one of the spring ends to contract the spring, and the other lug of the first member to driving engagement with the other lug of the second member.

4. In a clutch device, a casing, a shaft rotatably mounted therein, a driving member secured to the shaft, said member having a pair of spaced lugs, a second member rotatably supported solely by the shaft and having a pair of lugs engaging between the lugs of the first member, a coiled spring about the lugs of the said members within the casing and having inturned ends engaging over the edges of the shoulders of one of the spaces between the lugs of the first member and on opposite sides of the lug of the second member extending thereinto, the other lug of the second member extending within the space between the opposite edges of the lugs of the first member, the space between the lug of the second member and either spring end being approximately the same as the space between either edge of the other lug of the second member and an opposite respective edge of the lugs of the first member at any point of relative relation of said members providing a construction whereby rotation of the first member contracts the spring and then engages the second lug of the second member to drive the same, and rotation of the second member in either direction causes the spring to expand to frictional engagement with the casing.

5. In a clutch device, a cylindrical casing, a shaft rotatable therein, a driving member fixed to the shaft having a pair of lugs providing two practically oppositely disposed spaces therebetween, a driven member having a pair of lugs insertible in the said spaces between the lugs of the driving member, a cylindrical coiled spring engaging over the lugs of the two members within the casing and having its opposite ends inturned into one of the spaces between the lugs of the driving member and on opposite sides of the lug of the driven member extending thereinto, the arrangement of the lugs being such that on rotation of the first member the spring is contracted out of frictional contact with the casing and a lug of the second member is directly engaged by a lug of the first member whereby the second member is driven through rotation of the first member and rotation of the second member in either direction causes an expansion of the spring to locking engagement with the casing.

6. In a clutch device, a stationary cylindrical casing, a driving member rotatably supported therein having two practically oppositely disposed lugs and spaces therebetween, a driven member also rotatably supported within the casing and having a pair of practically oppositely disposed spaced lugs positioned in the spaces between the lugs of the driving member, a cylindrical coiled spring in the casing about the lugs of said members having each of its ends inturned into one of the spaces of the driving member on opposite sides of the lug of the driven member positioned therein, the arrangement and relationship of the spring and the lugs of the two members being such that rotation of the driven member in either direction causes an expansion of the spring and consequent frictional engagement thereof with the casing to lock the driving and driven members from rotation, and upon rotation of the driving member in either direction the spring through engagement of an end thereof with the respective lug of the driving member is first expanded, and thereafter the other lug of the driving member is brought to driving engagement with the lug of the driven member in the other space between the lugs of the driving member.

In testimony whereof we sign this specification.

EDWARD L. ACKERMAN.
ALOIS J. ZWIERZINA.